Nov. 14, 1961     C. RABIN     3,008,302
COMBINED HEATING AND REFRIGERATING UNIT
Filed Nov. 29, 1957
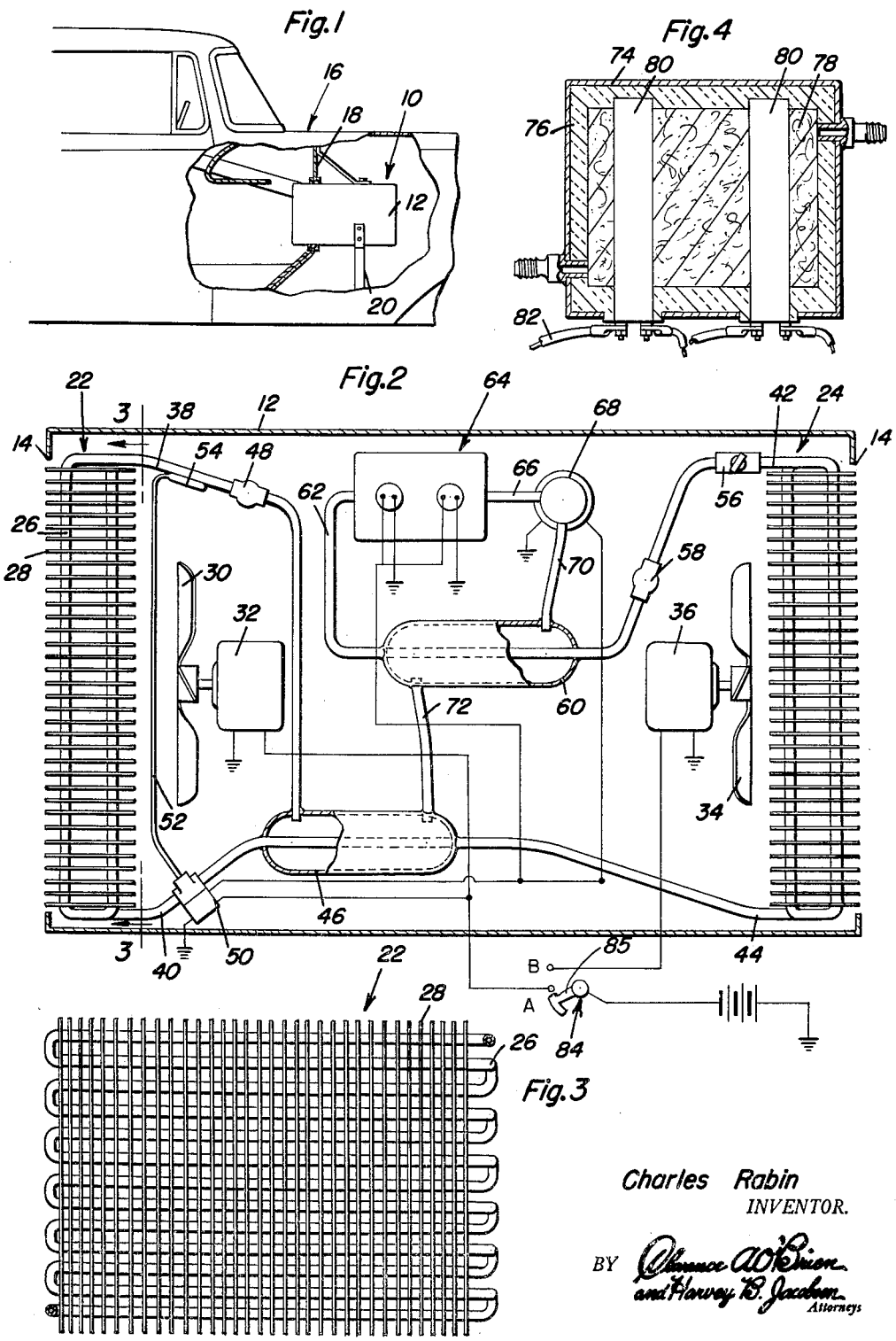
Charles Rabin
INVENTOR.

United States Patent Office 3,008,302
Patented Nov. 14, 1961

3,008,302
COMBINED HEATING AND REFRIGERATING UNIT
Charles Rabin, 2720 Fagot St., Metaire, La.
Filed Nov. 29, 1957, Ser. No. 699,746
5 Claims. (Cl. 62—159)

The present invention generally relates to a combination heating and refrigerating unit and is specifically adapted for use in automotive vehicles such as passenger carrying automobiles so that the single unit may be used for heating the interior of the passenger carrying compartment or for cooling the passenger carrying compartment depending upon weather conditions so that the passenger carrying compartment may be maintained at a comfortable temperature regardless of the outside temperature.

An object of the present invention is to provide a combined heating and refrigerating unit in which a pump and heating unit is employed for inducing flow of a heat exchange medium together with a novel construction of an evaporator and condenser of the coil fin type which is effective for purposes of heat exchange and provides an optimum heat exchange rate with a minimum of space.

Another object of the present invention is to provide a combined heating and refrigerating unit which is extremely simple in construction, easy to install, easy to operate, efficient in operation and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a partial side elevational view of an automobile with portions thereof broken away showing the combined heating and refrigerating unit of the present invention installed therein;

FIGURE 2 is a longitudinal, vertical sectional view of the combined heating and refrigerating unit with the electrical connections being shown schematically for purposes of clarity;

FIGURE 3 is a detailed sectional view taken substantially upon a plane passing along section line 3—3 of FIGURE 2 illustrating the construction of the coil fin evaporator; and FIGURE 4 is a detailed sectional view of the heating element incorporated in the present invention.

Referring now specifically to the drawings, the numeral 10 generally designates the combined heating and refrigerating unit of the present invention which incorporates a generally rectangular casing 12 having open ends 14 with the casing 12 being mounted in a vehicle generally designated by the numeral 16 by virtue of having the casing 12 inserted through the firewall 18 and mounted by suitable brackets 20 in a generally horizontal position. Thus, one open end 14 is disposed in the passenger carrying compartment on one side of the firewall with the other open end 14 being disposed in the engine compartment of the vehicle 16. The details of mounting the unit 10 in the vehicle are not specifically a part of the present invention in that any suitable mounting means may be provided.

In the open end of the casing 12 disposed within the passenger compartment is an evaporator construction generally designated by the numeral 22 while in the other end of the casing 12 is a condenser unit generally designated by the numeral 24. The evaporator and condenser are of substantially similar construction and include a multiplicity of coils or loops of a tube designated by the numeral 26 having a plurality of thin metal fins 28 thereon. The fins 28 increase the effective surface area for contact with air passing through the unit and the coils 26 are disposed in a relationship to each other so that the spacing between adjacent coils is exactly equal to the diameter of the tube from which the coils are constructed thus providing a larger number of loops or coils of tubing in a given size space thereby increasing the efficiency of heat exchange for the evaporator unit 22 and the condenser unit 24.

The evaporator 22 is provided with an air circulation fan 30 on the interior thereof with the fan being driven by a suitable electric motor 32 which is shown schematically and which may be supported in any suitable manner. Likewise, the condenser 24 is provided with an air circulation fan 34 with an electric motor 36 for driving the fan 34. The evaporator 22 is provided with a tube or conduit 38 at one extremity thereof and a conduit 40 at the other extremity thereof with the condenser 24 having similar tubes or conduits 42 and 44. The tube 44 communicates with the tube 40 and extends directly through the tubular heat exchanger 46 which may be secured thereto in sealed relation. The tube 38 extends into one end of the hollow heat exchanger 46 and discharges into the interior of the heat exchanger 46. A check valve 48 is provided in the tubular member 38. The tube 40 is provided with a thermostatic valve 50 between the heat exchanger 46 and the evaporator 22 and connected with the thermostatic valve and switch 50 is a capillary tube 52 communicated with a heat sensitive bulb 54 secured to the tube 38.

The tubular member 42 on the condenser 24 is connected with a manual service valve 56 and then extends downwardly into a check valve 58 and then extends through a heat exchanger of hollow construction designated by the numeral 60 which is substantially identical to heat exchanger 46. The tubular member 42 then extends upwardly as tubular member 62 into a heater generally designated by the numeral 64. From the heater 64, a tubular conduit 66 extends to a combination circulating pump 68 which is driven by a suitable electric motor with the circulating pump having an inlet conduit 70 extending into one end of the hollow interior of the heat exchanger 60. The other end of the hollow interior of the heat exchanger 60 is communicated with the hollow interior of the heat exchanger 46 by an interconnecting conduit 72.

As shown in FIGURE 4, the heater 64 includes a casing 74 having a lining of ceramic or porcelain material 76 and packed with copper or other corrosive resistant metallic wool designated by the numeral 78. A pair of electrical heating elements 80 are inserted through the metallic wool 78 and connected to electrical conductors 82 whereby the electrical heating elements 80 will heat the heat exchange medium as it passes through the heater and the packing of metallic wool will serve as a better conductor for the exchange of heat.

A suitable switch designated by the numeral 84 may be provided with the switch 84 including a switch arm 85 having three positions for engaging contacts A and B. These three positions will be a cool position, a heat position, and an off position. When the switch arm 85 is in the cool position it will contact both contacts A and B, this will energize the motor 32 and operate the evaporator cooling fan 30 as well as motor 36 for fan 34. This also will energize the heating elements 80 in the heater 64 and actuate the circulating pump 68 through the thermostatic switch 50. The evaporator being warm and the tube 38 being warm will cause thermostat valve 50 to remain open due to pressure in the capillary tube caused by expansion of the gas in the heat bulb 54. The thermostat valve and switch 50 acts as a control valve and allows liquid refrigerant to enter into the evaporator and will also keep the electrical contacts in the thermostatic valve closed to operate the circulating pump and motor 68, as well as the heating elements 80 in the heater 64. As the pump 68 draws the hot gas out of the evaporator 22 and causes the pressure to drop, more liquid refrigerant will enter the evaporator and evaporate causing a drop in temperature or cooling effect upon the interior of the automobile.

When the temperature drops to a predetermined point, it will cause the thermostat valve and switch 50 to close by reduction of pressure in the capillary tube and heat bulb which also opens the contacts therein and causes the circulating pump and motor and the heater to stop operating. However, the two cooling fans 30 and 34 will continue to operate.

As the evaporator 22 and tube 38 warm up, the thermostat valve 50 will open again and thus close the contacts to operate the pump and motor 68 and the heating element 64 for reducing the pressure in the evaporator and allowing more liquid refrigerant to enter the evaporator. As the cool gas is drawn from the evaporator 22 by the pump 68, it will pass through tube 38 into heat exchanger 46 or expansion chamber 46 through the check valve 48. Inasmuch as this heat exchanger 46 has the tube 44 passing therethrough from the condenser to tube 40, the continued expansion of the refrigerant gases will pick up more heat from the tube 44 which was not picked up by the condenser 24. From the heat exchanger 46, the gas then passes through tube 72 into heat exchanger 60 where further expansion of the gas may occur and it will further pick up heat from the hot gases as they leave the heater through tube 62 and enter the condenser through tube 42 thus completely employing the cooling effect of the refrigerant gas before it reaches the circulating pump for discharge into the heater 64. Inasmuch as the gas has now expanded three times, once in the evaporator, once in the heat exchanger 46 and once in the heat exchanger 60, it has picked up substantially all of the heat that it is capable of withdrawing and this expanded gas is then drawn from the heat exchanger 60 and discharged into the heater 64 by the pump 68. The pump 68 may be provided with an internal relief valve adjusted to open and bypass at 100 pounds per square inch pressure so that when the condenser cannot take any more gas pressure is built up and the relief valve and circulating pump opens and circulates the gas within itself. As the gas condenses to a liquid in condenser 24 causing a drop in pressure, the relief valve and pump 68 will close and pass the gas on through tubes 62 and 42. This passes the gas through the heater 64 where it picks up more heat from the electric heat elements built in the heater thus raising the temperature of the gas several degrees above the temperature of the air passing through the condenser 24. From the heater, the gas goes through the heat exchanger 60 where it is partially cooled, through check valve 58, through service valve 56, tube 42 and condenser 24. With the switch being in the cool position, the above cycle will be continuous and automatic which keeps the cooling fans operating constantly but cutting the circulating pump and heat device in and out through the thermostatic valve which depends upon the evaporator temperature with the thermostat valve also acting as a switch for the pump and heater.

In setting the switch arm 85 in the heat position, it engages only contact A which will disconnect the condenser fan motor 36 from the electrical circuit so that the gas will not cool in the condenser thereby stopping the refrigerating cycle. The heat position will operate the evaporator fan 30 continuously and heater 64 as well as pump 68 through the thermostat valve 50. With the evaporator 22 and tube 38 being warm, the thermostat valve 50 will be held open constantly allowing flow of the hot gas to circulate continuously through the evaporator and throughout the unit in which the gases pick up additional heat in the heater 64 and will discharge this additional heat to the air flowing through the evaporator 22 as caused by the fan 30 thus heating the air flowing through the evaporator 22.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a combined heating and refrigerating unit for passenger vehicles, and elongated hollow casing having opposed open ends with one of the open ends being disposed within the interior of the passenger compartment and the other end disposed exteriorly of the passenger compartment of the vehicle, an evaporator disposed adjacent the one end of the casing, a condenser disposed adjacent the other end of the casing, an air circulating fan disposed inwardly of the evaporator, an air circulating fan disposed inwardly of the condenser, a circulating pump having an intake communicated with the discharge of the evaporator for reducing the pressure in the evaporator and forming the sole means for removing refrigerant from the evaporator thereby permitting expansion of liquid refrigerant therein for reducing the temperature in the evaporator, a heater, said pump discharging expanded refrigerant gas into the heater, a conduit communicating said heater with the inlet of the condenser, the outlet of the condenser extending to the inlet of the evaporator, a thermostatically controlled valve for permitting expansion of refrigerant into the evaporator, said pump and heater also being controlled by said thermostatic valve, and means operatively connected with the fans, pump and heater for operating the same.

2. The combination of claim 1 wherein said heater includes a casing having a ceramic material on the inner surface thereof provided with a packing of metallic wool through which the refrigerant passes, and a pair of electrical heating elements extending across the interior of the casing for heating the metallic wool for increasing the efficiency of the heating of the refrigerant.

3. The combination of claim 2 wherein the evaporator and the condenser are each constructed of a plurality of tubular coils having fins thereon with the coils generally defining an elongated rectangular loop with the spacing between adjacent loops being substantially equal to the diameter of the tubular material from which the coil is constructed.

4. The combination of claim 3 wherein the return line from the condenser to the evaporator is provided with a first heat exchanger receiving refrigerant gas from the discharge of the evaporator and permitting further expansion thereof for picking up heat from the cooled refrigerant as it passes from the condenser to the evaporator.

5. The combination of claim 4 wherein the conduit extending from the heater to the inlet of the condenser passes through a second heat exchanger, said second heat exchanger receiving refrigerant gas from the first heat exchanger as it passes to the pump for permitting further expansion thereof for partial removal of heat from the heated gas as it passes from the heater to the condenser.

References Cited in the file of this patent

UNITED STATES PATENTS

| | | |
|---|---|---|
| 653,171 | Coleman | July 3, 1900 |
| 2,783,622 | Bourassa | Mar. 5, 1957 |